July 12, 1949.  R. G. BARTLETT  2,475,874
HAND TRUCK
Filed July 28, 1947  2 Sheets-Sheet 1
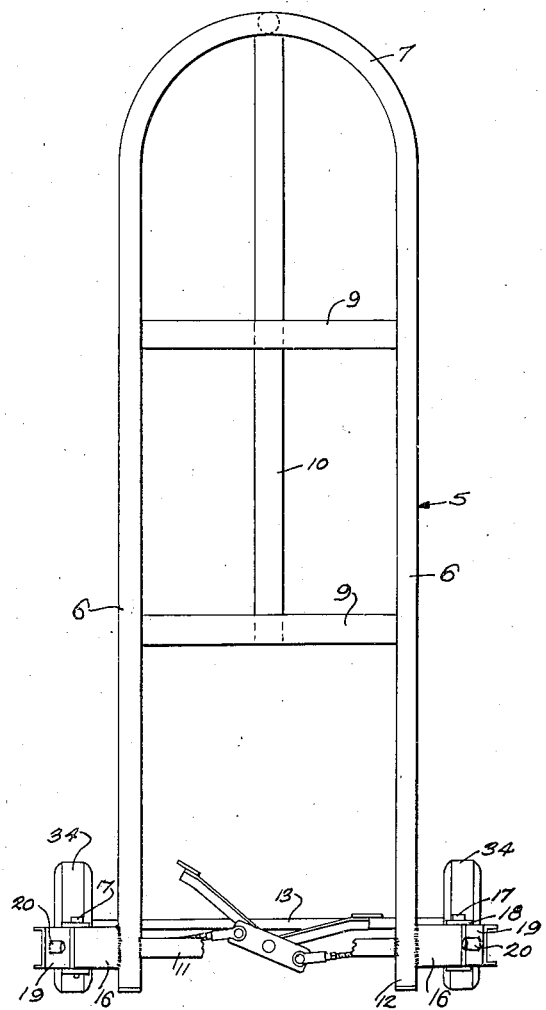
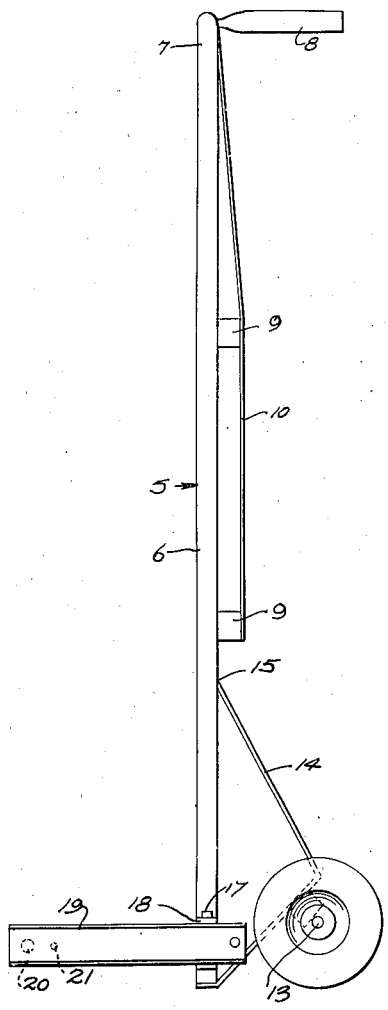
R. G. Bartlett
INVENTOR
BY  C. A. Snow & Co.
ATTORNEYS July 12, 1949.   R. G. BARTLETT   2,475,874
HAND TRUCK
Filed July 28, 1947   2 Sheets-Sheet 2
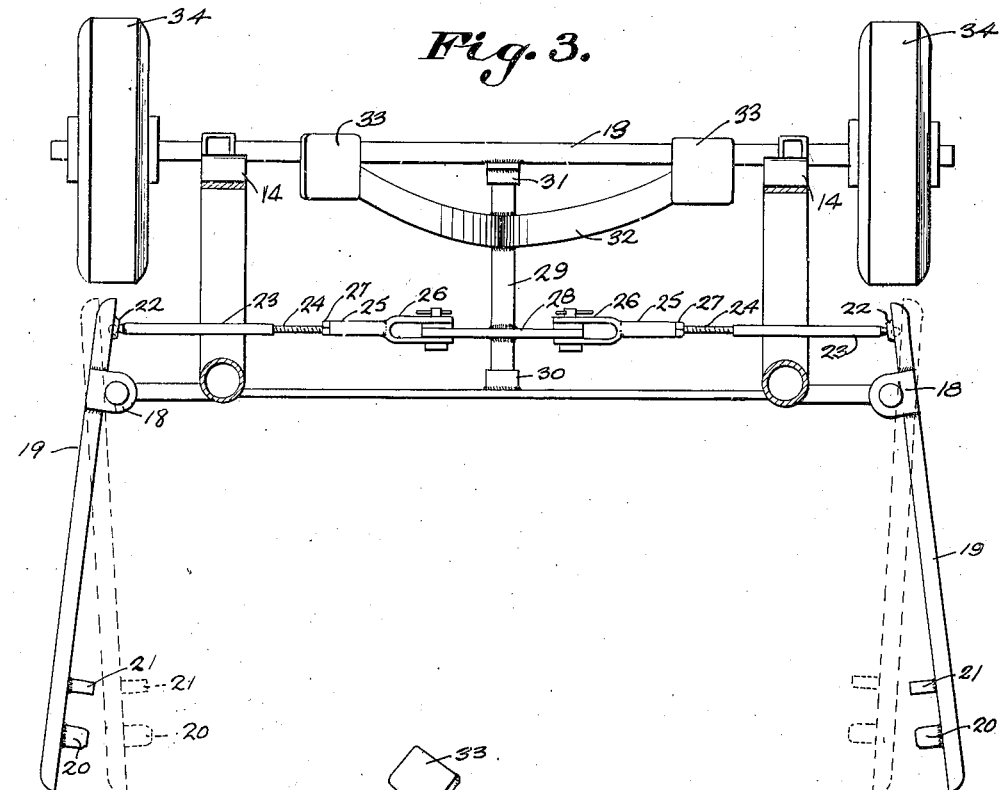
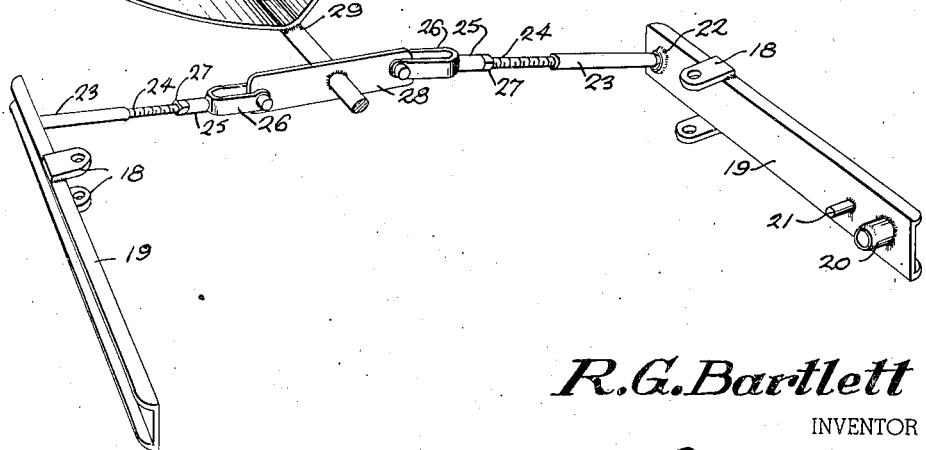
R.G. Bartlett
INVENTOR
BY C.A.Snow&Co.
ATTORNEYS

UNITED STATES PATENT OFFICE 2,475,874

HAND TRUCK

Ralph Gilbert Bartlett, Lakeland, Fla.

Application July 28, 1947, Serial No. 764,045

1 Claim. (Cl. 214—65.5)

This invention relates to hand trucks, and more particularly to hand trucks of the pick-up type, designed for use in moving crated bottled goods, wherein the crates are provided with hand holds for lifting purposes.

An important object of the invention is to provide a truck of this character including a pair of pivoted arms, means being provided for operating the arms to move the arms into clamping relation with the crate or box to be lifted, the arms having lifting lugs that move into the hand holds of the crate or box, to prevent displacement of the crate or box being lifted.

Another object of the invention is to provide a pedal whereby the arms are operated to move them into or out of contact with the crate or box being lifted, the pedal being so constructed and arranged that the links connecting the pedal with the pivoted arms, move to positions past dead center, locking the arms in their gripping positions.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings:

Figure 1 is a front elevational view of a hand truck constructed in accordance with the invention, the pivoted gripping jaws of the truck being shown in their open positions.

Figure 2 is a side elevational view of the truck.

Figure 3 is a plan view of the truck in its standing or upright position, the truck frame being shown in section.

Figure 4 is a perspective view illustrating the positions of the clamping arms when in their closed or clamping positions.

Referring to the drawings in detail, the truck comprises a frame indicated generally by the reference character 5, the frame being formed preferably of a length of tubular material bent intermediate its ends, providing side members 6 and a curved handle section 7, to which the hand grip 8 is secured, preferably by welding.

The frame is braced by the transverse bars 9 that are spaced apart, as shown by Figure 1 of the drawings, the bars 9 being connected by means of the bar 10 which extends from the lowermost transverse bar 9 across the adjacent bar 9 where it is secured thereto, the end of the bar 10 being welded to the curved handle section 7.

The lower ends of the side members 6 are held spaced apart by means of the bar 11 that has its ends welded between the side members at a point in spaced relation with the ends of the side members providing feet 12. The axle of the truck, which is indicated by the reference character 13, is secured to the offset arms 14 which have their forward ends extended under the feet 12, providing bearing surfaces on which the frame rests when in its upright position, as shown by Figure 2 of the drawings. The opposite ends of these offset arms are welded to the side members 6 at 15.

Heavy lugs 16 are welded to the outer surfaces of the side members 6 and are formed with openings in which the pins 17 are mounted, the pins also passing through the ears 18 which are spaced apart and formed adjacent to the inner ends of the pivoted clamping arms 19.

Formed on the inner surfaces of the clamping arms 19, are lifting lugs 21 that are adapted to extend into the hand holds formed in the end members of the usual crates in which bottled goods are transported. Arranged with each lifting lug, is a balancing lug 21 which extends inwardly from the inner surfaces of the arms 19 in direct lines with the lifting lugs 20, with the result that when a lifting lug is positioned within a hand hold of a crate, the balancing lug adjacent thereto will lie at a point past the center of the hand hold in which it is positioned, thereby holding the crate against pivoting on the lifting lugs.

Disposed at the inner ends of the clamping arms 19 and extending inwardly from the inner surfaces thereof, are socket members 22 in which the ball ends of the tubular members 23 are disposed, the tubular members 23 being internally threaded to accommodate threaded tubular sections 25 of the yokes 26, there being provided lock nuts 27 on the screws 24 that bind against the ends of the tubular sections 25, securing the screws 24 in their positions of adjustment. Due to this construction, it will be seen that by loosening the lock nuts 27, the screws 24 may be readily rotated to adjust the throw of the pivoted clamping arms to adjust the arms for use in clamping crates or boxes of various sizes.

Yokes 26 have pivotal connection with the arm 28 that is secured to the shaft 29 which has one end thereof pivotally mounted within the bearing 30, extending inwardly from the bar 11, as shown by Figure 3 of the drawings. The rear end of this shaft 29 is pivotally mounted within the bearing 31 that is welded to the axle 12, so that the shaft 29 may be readily rotated with a minimum amount of exertion on the part of the operator. Secured to the shaft 29 is a curved arm 32, curved in such a way that the ends thereof extend upwardly, the ends being provided with pedals 33, so that the person using the truck may operate the jaws by foot pressure and without leaning over to hold the crates in order to position the clamping arms.

As shown by Figure 4 of the drawings, the construction of the operating mechanism is such that when the pivoted clamping arms are in their clamping positions, the pivot points between the yokes 26 and arm 28, will be rocked past dead center to the end that the arms are securely held against outward movement under the pressure of the crates being supported by the truck.

It will, of course, be understood that by operating the foot pedal, the shaft 29 may be rotated to move the arms in the desired manner to open or release the load. Mounted on the axle 12, are rubber supporting wheels 34, which permit of easy rolling of the truck, even when loaded.

In using the truck, the truck is moved to a position so that the arms in their open positions will lie opposite to the ends of a crate to be moved, the lifting lugs 20 being opposite to the hand holds of the crates. The operator now places his foot on the high end of the curved arm 32 and forces it downwardly, with the result that the lifting lugs 20 are moved into the hand holds of the crate, and the clamping arms are moved into clamping relation with the ends of the crate, securely holding the crate between the arms. Because of the construction of the frame a number of crates may be positioned one upon another, should it be desired to transport several crates on a truck, for transportation.

To release the load it is only necessary to allow the frame to move vertically or to a position as shown by Figure 1 of the drawings. The high end of the curved arm 22 is now pressed downwardly, which causes the clamping arms 19 to move away from the ends of the crates, the lifting lugs 20 moving from the hand holds releasing the crates and lifting the crates in a tier.

I claim:

In a hand truck, a wheel-supported frame including side bars, a transverse bar connecting the side bars with the lower front end of the frame, load clamping arms, spaced ears extending from the arms between which the ends of the transverse bar are disposed pivotally mounting said clamping arms thereon, said arms extending in parallel spaced relation with each other, sockets formed adjacent to the pivoted ends of the load clamping arms, tubular members having heads fitted within the sockets, said tubular members being internally threaded, adjusting screws extending into the tubular members, a curved operating arm, pivoted yokes connected with the operating arm, adjusting screws extending into the yokes, connecting the screws and yokes, a shaft to which the operating arm is connected, a curved pedal arm secured to the shaft, a pedal for operating the operating arm whereby the load clamping arms are pivoted into and out of engagement with the load lifting lugs and connecting means between the yoke and operating arm moving past dead center securing the load clamping arms against movement under normal conditions.

RALPH GILBERT BARTLETT.

REFERENCES CITED

The following references are of record in the file of this patent:

UNITED STATES PATENTS

| Number | Name | Date |
| --- | --- | --- |
| 235,647 | Peatie | Dec. 21, 1880 |
| 1,711,577 | Radka | May 7, 1929 |
| 1,795,856 | Gravatt | Mar. 10, 1931 |
| 2,003,038 | Collins | May 28, 1935 |
| 2,105,210 | Berg | Jan. 11, 1938 |
| 2,367,752 | Broome | Jan. 23, 1945 |